Feb. 2, 1971  E. J. KLEINER ET AL  3,559,400
ACTUATOR
Filed Sept. 19, 1969  2 Sheets-Sheet 1
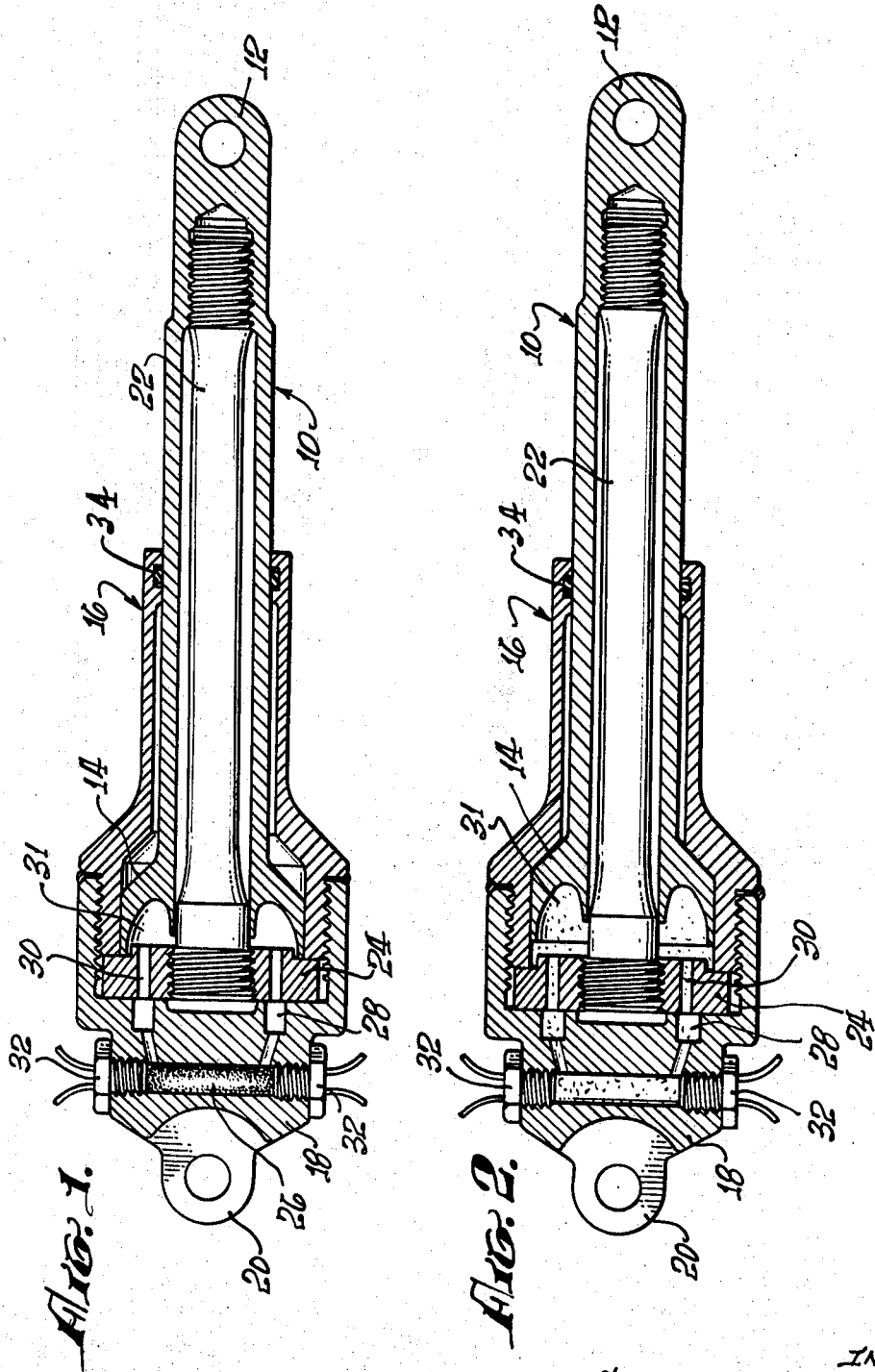
INVENTORS.
ERICH J. KLEINER,
GERALD A. PIERIK,
By Albert J. Miller
ATTORNEY.

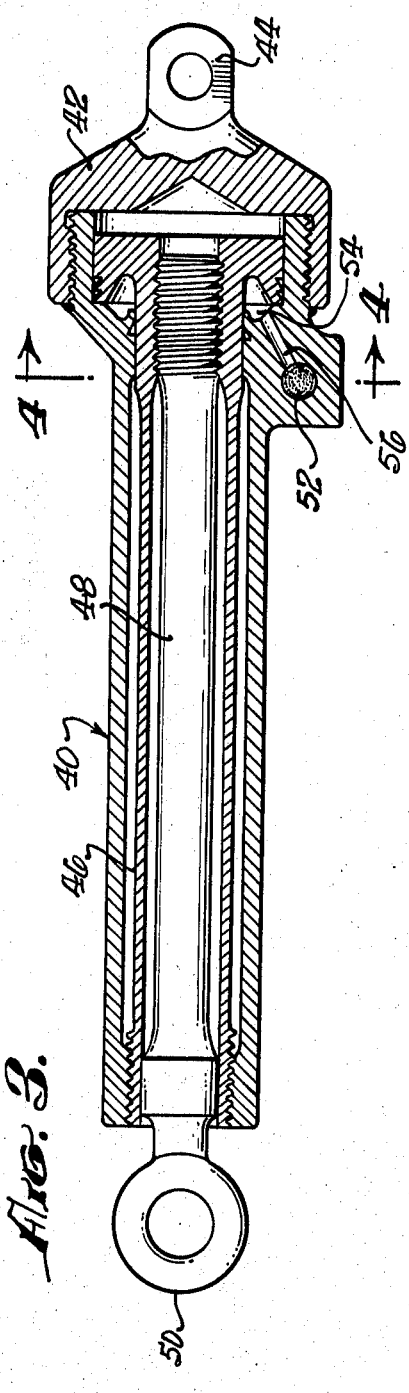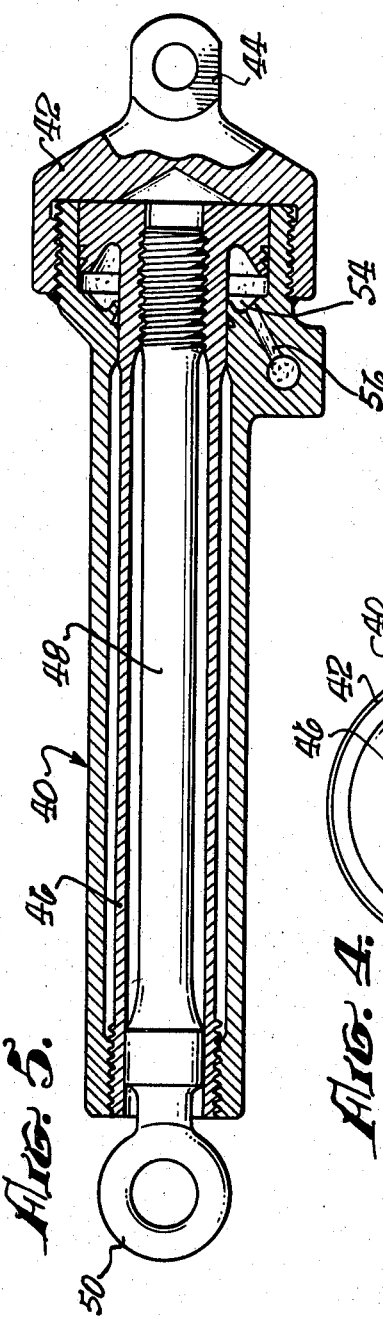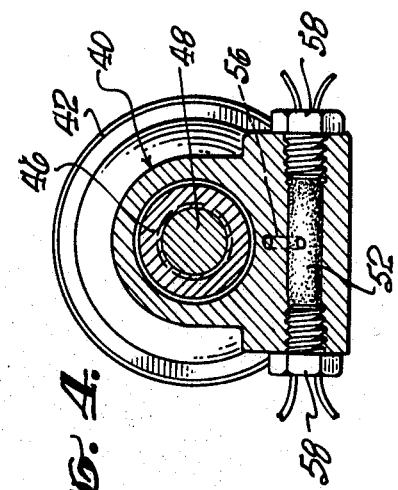

United States Patent Office 3,559,400
Patented Feb. 2, 1971

3,559,400
ACTUATOR
Erich J. Kleiner and Gerald A. Pierik, Palos Verdes Peninsula, Calif., assignors to The Garrett Corporation, Los Angeles, Calif., a corporation of California
Filed Sept. 19, 1969, Ser. No. 859,376
Int. Cl. F01b 29/08
U.S. Cl. 60—26.1
12 Claims

ABSTRACT OF THE DISCLOSURE

An actuator to either shorten or lengthen the distance between the two load connections. The actuator includes a tension member which is permanently deformed by actuation of the actuator and includes means to limit the magnitude of deformation upon activation.

BACKGROUND OF THE INVENTION

In a load supporting device, there are many applications in which it is desirable to vary the distance between the load connecting ends of the device. One example of this is in a dual rotor helicopter which requires synchronization of the two rotors to avoid collision of the individual blades since the rotors overlap in the plane of rotation.

To prevent collision of the rotors in the event of rotor desynchronization, it is necessary to displace the rotors out of an overlapping plane of rotation. A load supporting actuator, increasing the length between its load connecting ends, can displace the aft rotor disk downward while a similar actuator, by decreasing the length between its load connecting ends, can displace the forward rotor disk upward.

No satisfactory actuator has been developed to meet the need described above, particularly where the loads are extensive as they are in a helicopter rotor. Previous attempts have been directed towards ratcheting and latching mechanisms whose reliability is extremely questionable.

SUMMARY OF THE INVENTION

The present invention is directed to a load supporting actuator having load connections at both ends of a tension member in the actuator. By permanently deforming the tension member, the distance between the load connections can be varied to effect the desired result. By varying the relationship of the tension member to the load connections, the distance between the load connections can be either increased or decreased.

BRIEF DESCRIPTION OF THE DRAWINGS

FIG. 1 is a sectional view of an extending actuator in its normal position.

FIG. 2 is a sectional view of the extending actuator of FIG. 1 in its extended position.

FIG. 3 is a sectional view of a retracting actuator in its normal position.

FIG. 4 is a sectional view of the retracting actuator of FIG. 3 taken along line 4—4.

FIG. 5 is a sectional view of the retracting actuator of FIG. 3 in its retracted position.

DESCRIPTION OF THE PREFERRED EMBODIMENTS

Since it is necessary to have an actuator that will increase or extend the length between load connections and also to have one that will reduce or retract the length between load connections, the present invention provides an extending actuator and a retracting actuator. Both actuators operate in the same fashion and include the same basic components. The change from extending actuator to retracting actuator is accomplished simply by a rearrangement in the configuration of the various basic components.

The extending actuator is illustrated in FIGS. 1 and 2. A substantially hollow cylindrical actuation tube 10 is provided with a load connection 12 at one end thereof and flared at the opposite end to define a shoulder 14. The flared end of the actuator tube 10 is slidable within an enlarged end of the actuation housing 16 which extends around a portion of the actuation tube 10. The actuation housing 16 is threaded into the cup shaped portion of a base 18 having a load connection 20 at the other end thereof. An elongated tension bar 22 having one end threaded into the base 18 or a tension bar retainer 24 held in the base 18 by the actuation housing 16, extends within the actuation tube 10 and is threaded into the end of the hollow portion of the tube 10. A propellant or gas generating charge 26 is positioned within the base 18 and communicates with the flared end of the actuation tube 10 through a plurality of slots 28 in the base 18 and slots 30 in the tension bar retainer 24. The flared end of the tube 10 may include gas pressure pockets 31 opposite the slots 30. Electrically actuated squibs 32 may be provided at both ends of the propellant charge 26. Alternately, an external source of pressurized gas (not shown) can be provided for actuation.

The assembly of the actuator shown in FIG. 1 can be accomplished in a number of different ways. For example, the propellant charge 26 and squibs 32 can be inserted into the base 18. The tension bar 22 can then be screwed into the retainer 24 and actuation tube 10. The actuator housing is then slipped over the actuation tube 10 and threaded into the base 18. The housing 16 will hold the retainer 24 within the cup shaped portion of the base 18.

In order to provide a rigid assembly, the tension bar 22 should be pre-tensioned to a predetermined level depending upon the loads anticipated. Also, once the housing 16 has been threaded into the base 18, it may be welded to the base to prevent loosening. Also, the threaded joints at both ends of the tension bar 22 may be brazed. An O-ring 34 may be provided between the opposite end of the housing 16 and the actuation tube 10.

In operation, an electrical signal is transmitted to the squibs 32 which ignites the propellant charge 26. Detonation of the charge creates a high gas pressure which is transmitted to the flared end of the tube 10 by means of the slots 28 and 30. This gas pressure acts upon the flared end of the tube 10 and forces the tension bar 22 to deform or stretch beyond its yield point until the shoulder 14 of the tube 10 is stopped by the housing 16.

As shown in FIG. 2, the result of the above-described sequence of events, in a matter of milliseconds, results in an increase in distance between the load connections 12 and 20. Since the tension bar 22 has been deformed beyond its yield point, this extension is permanent and the actuator is still able to hold this extended position against the imposed loads. To facilitate the movement of the flared end of the tube 10, those portions of the tube in contact with the inside of the housing 16 and bar 22 can be silver plated.

In order to achieve the stretching of the tension bar, it is necessary to provide that the actuation tube be able to transmit considerably higher loads than the tension bar. This can be accomplished by the selection of materials and relative sizing. The tension bar should be of a relatively ductile material, having low yielding strength, having a high endurance limit, and having a high allowable stress. AISI Type 304 Stainless Steel Annealed has been found to provide satisfactory results. 4330 Modified Steel can be utilized for the other actuator components.

The retracting actuator is illustrated in FIGS. 3, 4 and 5. A hollow cylindrical actuator housing 40 is threaded into a substantially cup-shaped base 42 having a load connection 44 at the opposite end. Concentrically, arranged within the housing 40, are a tension tube 46 and actuator bar 48. One end of the tension tube 46 is flared to slide within the cup-shaped base 42. The opposite end of the tube 46 is threaded into the housing 40. One end of the actuator bar 48 is threaded into the flared end of the tension tube 46 while the other end terminates in a load connection 50 which extends beyond the housing 40.

The propellant charge 52 is positioned at the base end of the housing 40 and communicates with a gas pressure groove 54 in the flared end of the tension tube 46 through slots 56. Electrically actuated squibs 58 are situated at either end of the propellant charge 52.

The assembly of the retracting actuator can be accomplished in a manner similar to the extending actuator and it, too, should be pretensioned to insure a rigid assembly. The threaded junctions can likewise be welded or brazed to provide a permanent joinder.

The operation of the retracting actuator is similar to that of the extending actuator except that the end result is the shortening of the distance between load connections. Receipt of an electrical signal by the squibs 58 will result in the detonation of the propellant charge 52 which will in turn generate gas pressure against the tension tube groove 54 through slots 56. This gas pressure will force the tension tube 46 to stretch beyond its yield point by driving the flared end thereof against the bottom of the cup-shaped base 42. The stretching, which is permanent, will pull the load connection 50 of the actuator bar with it so that the load connection is moved a short distance closer to load connection 44 of the base 42.

Although the actuators of the present invention have many useful applications, they are particularly advantageous to prevent the collision of the two rotors of a dual rotor helicopter in the event of rotor desynchronization. The extending actuator can be used to displace one rotor disk downward while the retracting actuator can displace the other rotor disk upward. The actuator can withstand the loads involved before extension or retraction and also the load imposed afterwards. The amount of permanent deformation required is well within the fail limits of the material selected. The signal required for actuation of the squibs can be provided by an electronic monitoring system which measures the phase relationship of the two rotors. In case of a phase shift, which would imply that the rotor blades are on a collision course, the signal would be given to the squibs. A stroke or change in distance between load connections of 0.250 in. would be sufficient to prevent a collision of the rotors.

Each actuator will maintain its normal in-flight position by holding against a bottoming stop. Likewise, each contains an independent propellant or gas generator charge. Accidental operation will not present any hazards to the helicopter or its personnel. The actuators can be easily disarmed for storage, transportation, installation and/or removal from the helicopter.

What is claimed is:
1. An actuator comprising:
  elongated load support means having load connecting means at both ends thereof and a tension member extending between said load connecting means; and
  means operably associated with said load support means to permanently deform said tension member a controlled, predetermined distance to alter the distance between the load connecting means at opposite ends of said load support means.
2. The actuator of claim 1 wherein said load support means comprises:
  a base member having a load connecting means at one end thereof and an actuation housing defining an enclosure at the other end thereof; an actuation tube having a load connecting means at one end thereof and an enlarged portion at the other end thereof slidable within the base member enclosure; and a tension member extending within said actuation tube and having one end affixed to the base member within the enclosure thereof and the other end affixed within said actuation tube.
3. The actuator of claim 2 wherein said means to permanently deform said tension member is a gas generating charge positioned within said base member and communicating with said base member enclosure.
4. The actuator of claim 3 wherein said gas generating charge is electrically actuated.
5. The actuator of claim 1 wherein said load support means comprises:
  a base member having load connecting means at one end thereof and a hollow elongated actuation housing at the other end thereof, said actuation housing forming an enlarged enclosure with said base member and extending outward therefrom; a hollow tension member having an enlarged portion at one end slidable within the base member enclosure and the other end affixed to said extended end of said actuator housing; and an actuator bar positioned within said tension member and having one end affixed to the enlarged end of said tension member and the other end extending outward from said tension member and including load connecting means.
6. The actuator of claim 5 wherein said means to permanently deform said tension member is a gas generating charge positioned within said base member and communicating with base member enclosure.
7. The actuator of claim 6 wherein said gas generating charge is electrically actuated.
8. An actuator comprising:
  a base member having a load connector at one end thereof and an actuation housing at the other end thereof, said actuation housing forming an enlarged enclosure with said base member and extending outward therefrom;
  elongation means having an enlarged portion at one end thereof slidable within the base member enclosure and a load connector at the other end thereof extending outward from the actuation housing of said base member, said elongation means including a tension member affixed at one end thereof to said base member; and
  means operably associated with said base member to permanently deform said tension member a controlled, predetermined distance to alter the distance between the load connector of said base member and the load connector of said elongation means.
9. The actuator of claim 8 wherein said means to permanently deform said tension member is a gas generating charge positioned within said base member to exert, when actuated, a gas pressure upon the enlarged portion of said elongation means.
10. The actuator of claim 8 wherein said elongation means is prestressed.

11. The actuator of claim 8 wherein said elongation means comprises an actuation tube having a load connector at one end thereof and an enlarged portion at the other end thereof slidable within the base member enclosure and a tension bar extending within said actuation tube having one end affixed to said base member and the other end affixed within said actuation tube.

12. The actuator of claim 8 wherein said elongation means comprises a tension tube having an enlarged portion at one end slidable within the base member enclosure and the other end affixed to the extended end of said actuator housing and an actuator bar positioned within said tension tube having a load connector on one end thereof and the other end thereof affixed to the enlarged end of said tension member.

References Cited

UNITED STATES PATENTS

| | | | |
|---|---|---|---|
| 3,024,592 | 3/1963 | Leaman | 60—26.1 |
| 3,111,808 | 11/1963 | Fritz | 60—26.1 |
| 3,354,634 | 11/1967 | McGirr | 60—26.1 |
| 3,464,284 | 9/1969 | Fergle | 60—26.1X |
| 3,487,710 | 1/1970 | Fergle | 60—26.1X |

WENDELL E. BURNS, Primary Examiner